United States Patent Office 3,597,250
Patented Aug. 3, 1971

3,597,250
COMPOSITION FOR PRODUCING PEARLESCENT EFFECTS IN COSMETIC PRODUCTS
Robert D. Rands, Jr., and Douglas W. Chapman, Greendale, Mo., assignors to Mallinckrodt Chemical Works, St. Louis, Mo.
No Drawing. Filed Oct. 10, 1968, Ser. No. 766,614
Int. Cl. C09c 1/00
U.S. Cl. 106—291                              9 Claims

ABSTRACT OF THE DISCLOSURE

Bismuth oxychloride is deposited, preferably epitaxially, on thin mica platelets to produce a pearlescent pigment particularly useful in cosmetic products. The pigment is produced by adding a base to an aqueous suspension of mica containing a soluble bismuth salt and an excess of chloride ions to precipitate bismuth oxychloride on the surface of the mica platelets. Preferably a solution of the bismuth and a solution of the base are simultaneously added to the mica suspension at rates such that the suspension always contains an excess of the soluble bismuth salt. The resulting products are characterized by their low density, ease of suspension, and by the unusual translucency of the pearly effect which they impart to various cosmetic compositions.

BACKGROUND OF THE INVENTION

Field of the invention

This invention relates to pearlescent pigments and more particularly to pigments that are suitable for imparting a pearlescent effect in cosmetic formulations.

SUMMARY OF THE PRIOR ART

In the field of cosmetology it is considered esthetically pleasing to impart a pearlescent or satiny effect to the lips, eye lids, nails and other features. For producing such effects in cosmetic products such as lipstick, nail polish, face powders, eye shadow, mascara, eye liner, hair spray, eyebrow cake, liquid and cream makeup and rouge, various substances have been used. One desirable material has been guanine, but it is very expensive. It is also known that bismuth oxychloride can be produced in the form of thin platelets which, when dispersed in a suitable medium and spread or smeared on the skin, impart a pearlescent or satiny sheen, and bismuth oxychloride is known to be safe and non-irritating to the skin. But bismuth too is rather expensive and moreover it is difficult to obtain a uniform stable dispersion of this bismuth compound in certain cosmetic formulations.

It has also been known to coat thin platelets of mica, which by itself is not a suitable pearlescent pigment, with a highly refractive pigment such as titanium dioxide, zinc sulfide or the like. While these latter pigments impart a sheen or luster somewhat resembling pearlescence, the result lacks the soft satiny appearance characteristic of pearls.

Pearlescent pigments consisting of mica platelets coated with bismuth oxychloride have not been known heretofore. It would be expected that excessively large quantities of such pigments would be necessary to achieve a desired pearlescence, and they would therefore be troublesome and of little practical value.

SUMMARY OF THE INVENTION

Among the objects of the present invention may be noted the provision of pearlescent pigments which are easily dispersed in cosmetic preparations, which are non-toxic and non-irritating to the skin, and which do not impart a harsh metallic luster but rather a soft satiny effect characteristic of true pearlescence; the provision of pearlescent pigments having an enhanced pearlescent effectiveness in cosmetic preparations; and the provision of methods for coating the surfaces of mica platelets with precipitated bismuth oxychloride to form a pearlescent pigment. Other objects and features will be in part apparent and in part pointed out hereinafter.

The invention accordingly comprises the products and methods hereinafter described, the scope of the invention being indicated in the following claims.

According to the present invention pearlescent pigments particularly advantageous for use in cosmetics comprise thin platelets of mica the surfaces of which are substantially coated with a deposit of bismuth oxychloride, preferably an epitaxial deposit, the bismuth oxychloride comprising 10–75% by weight of the pigment. Surprisingly, it has been found that much smaller quantities of bismuth are required to impart a given pearlescent effect than if platelets of pure bismuth oxychloride alone are used. For example, it has been found that one gram of bismuth oxychloride when precipitated on mica platelets imparts a pearlescent effect equivalent to that imparted by two grams of pure bismuth oxychloride in the form of platelets of similar shape and size. Moreover it has been found that such pigments, being less dense than pure bismuth oxychloride, are more readily dispersed in cosmetic formulations, settle out more slowly, and are less inclined to form objectionable streaks or striations in lipsticks.

The invention also relates to methods for depositing a coating of bismuth oxychloride, preferably an epitaxial deposit, on mica platelets which comprise adding a base to an aqueous solution containing an excess of a soluble bismuth salt and an excess of chloride ions so as to produce a product containing 10–75% by weight of bismuth oxychloride.

As used herein the term "pearlescent" denotes the property of imparting a pearl-like luster to other materials, more particularly, to cosmetic compositions.

DESCRIPTION OF THE PREFERRED EMBODIMENTS

The following examples illustrate the invention:

EXAMPLE 1

Preparation of a pigment containing 40% bismuth oxychloride on mica

A solution of 377 g. of $Bi(NO_3)_3.5H_2O$ in a mixture of 2240 ml. of 5 N hydrochloric acid and 669 ml. of 5 N nitric acid was prepared. This was diluted with 26 liters of water and filtered to remove any precipitated bismuth oxychloride, the filtrate being designated as Solution C.
Also prepared were the following solutions:

Solution A

| | Grams moles |
|---|---|
| $Bi(NO_3)_3.5H_2O$ | 25.4 |
| $HNO_3$ | 54 |
| HCl | 66 |
| $H_2O$ to make 29 liters. | |

Solution B

| | |
|---|---|
| NaOH | 106.8 |
| $H_2O$ to make 89.4 liters. | |

Solution C and 8.9 kg. of −325 mesh mica were combined in a glass-lined vessel. The mixture was stirred and heated to 97–100° C. The addition of Solution A was begun at a constant rate such that addition was completed in 80 minutes. Ten minutes after the beginning of the addition of Solution A, the addition of Solution B was begun also at a constant rate such that addition was completed in 80 minutes.

After a quarter of an hour the mixture was cooled to about 70° C. and the product collected by filtration. (The filtrate served in place of Solution C in subsequent runs.) The cake was washed well with water.

EXAMPLE 2

Particle size classification of mica coated with bismuth oxychloride

The product from Example 1 was reslurried in 45 gal. of water and then classified using a Sweco shaker equipped with 325 mesh U.S. standard sieve screens. The −325 mesh product was then centrifuged and washed twice with 2-gal. portions of isopropyl alcohol and then twice more with 2-gal. portions of petroleum ether.

The −325 mesh material weighed 13.26 kg. (86.4% of theory) and assayed 41.3% BiOCl.

Microscopic examination showed the bismuth oxychloride to be substantially all in the form of an epitaxial deposit on the mica platelets with only a small and insignificant amount of free bismuth oxychloride.

EXAMPLE 3

Preparation of compositions containing 30% BiOCl using urea as the precipitant

In a 200 ml. flask, 10 g. (0.02 mol.) of $Bi(NO_3)_3.5H_2O$ was completely dissolved in 16 ml. of 5 N hydrochloric acid to which was added 7.4 g. of mica flakes. After heating the mixture to gentle boiling, a solution of 9.6 g. (0.16 mol.) of urea in 48 ml. of water was added over a period of 35 minutes. The mixture was refluxed for a total of 2½ hours. After the mixture cooled it was filtered and the solid product was washed with water and then dried in a steam cabinet. The dried cake was passed through a U.S. standard 20 mesh sieve. It contained approximately 30% bismuth oxychloride.

EXAMPLE 4

Alternative preparation of compositions containing 40% BiOCl

In a one liter flask a solution of 1.3 g. $Bi(NO_3)_3.5H_2O$, 7.7 ml. of 5 N hydrochloric acid, and 2.3 ml. of 5 N nitric acid, was diluted to 100 ml. and filtered. To the filtrate was added 37 g. of mica platelets and the mixture was stirred and heated to reflux.

To this reaction medium Solution A [50 g. (0.1 mol.) of $Bi(NO_3)_3.5H_2O$ and 45 ml. of 5 N nitric acid] was added in 10 ml. increments at 10 minute intervals. After the first 10 ml. increment was added, Solution B [17.6 g. (0.44 mol.) of NaOH dissolved in 375 ml. of water] was added at a continuous rate of 3.1 ml./min. The addition time was 2½ hours.

The reaction mixture was next cooled to 70° C., filtered, washed first with 100 ml. of water and then with 100 ml. of ethanol, and dried in a steam cabinet. The dried cake was sieved through a U.S. standard 20 mesh sieve. The yield was 93% of theory, and the coated platelets contained approximately 40% bismuth oxychloride.

EXAMPLE 5

Alternative preparation of a pigment containing 40% BiOCl using urea as the precipitant In a 500 ml. flask, 50 g. (0.1 m.) of $Bi(NO_3)_3.5H_2O$ was dissolved in 80 ml. of 5 N hydrochloric acid, 37 g. of −325 mesh mica was added, and the mixture was stirred and heated to reflux. A solution of 48 g. (0.8 mol.) of urea in 240 ml. of water was added continuously over a period of 32 minutes. Total reflux time was 2½ hours.

The reaction mixture was cooled to 35° C., filtered, washed first with 200 ml. of water and then with 100 ml. of ethanol, and dried in a steam cabinet. The dried cake was brushed through a U.S. standard 20 mesh sieve. The yield was 95% of theory. The pigment contained approximately 40% bismuth oxychloride.

EXAMPLE 6

Alternative preparation of a pigment containing 40% BiOCl using sodium hydroxide as the precipitant In a 1 liter flask 100 ml. of mother liquor from a previous reaction was heated to reflux and 37 g. of −325 mesh mica was added with stirring. A solution of 50 g. of $Bi(NO_2)_3.5H_2O$ in 55 ml. of 5 N hydrochloric acid and 45 ml. of 5 N nitric acid was added in 10 ml. incerments at 10 minute intervals. After the first 10 ml. addition, a solution containing 17.6 g. (0.44 mol) of NaOH in 375 ml. of water was added continuously at a rate of 3 ml./min. The reaction time was 2 hours.

The reaction mixture was cooled to 45° C., filtered, and the solid was washed first with 200 ml. of water and then with 200 ml. of ethanol. The cake was dried in the steam cabinet overnight. Finally, the material was brushed through a U.S. standard 20 mesh sieve. The yield was 95% of theory. The pigment contained approximately 40% bismuth oxychloride.

EXAMPLE 7

Ppreparation of a pigment containing 40% BiOCl with all of the bismuth nitrate initially present in the reaction vessel In a one liter flask 50 g. (0.1 mol) of $Bi(NO_3)_3.5H_2O$ was dissolved in 55 ml. of 5 N hydrochloric acid and 45 ml. of 5 N nitric acid. To this solution 37 g. of −325 mesh mica was next added. The mixture was stirred and heated under reflux. A solution of 17.6 g. (0.44 mol) of NaOH in 375 ml. of water was added at a rate of 1.7 ml./min. The addition time was 3½ hours.

The mixture was cooled to 45° C., filtered, and the solid was washed first with 150 ml. of water and then with 150 ml. ethanol, and dried in a steam cabinet. Finally the product was brushed through a U.S. standard 20 mesh sieve. The yield was 94% of theory, and this pigment also contained approximately 40% bismuth oxychloride.

EXAMPLE 8

Preparation of a pigment containing 20% BiOCl

In a 12 l. flask 1070 g. of −325 mesh mica was slurried with 1930 ml. of mother liquor from a previous reaction and stirred at reflux. To this was added 1150 ml. of a solution containing 504 g. (1.04 mol) of $Bi(NO_3)_3·5H_2O$, 291 mls. of 30% hydrochloric acid, 146 mls. of 56% nitric acid and 150 mls. of water in 192 ml. portions at 10 minute intervals. After the first portion was added, a solution containing 352 g. of sodium hydroxide in 3570 mls. of water was added continuously at a rate of 62.5 ml./min. The addition time was one hour.

The mixture was cooled to 50° C., filtered, washed with 1800 ml. of water and classified on a Sweco shaker fitted with a U.S. standard 325 mesh screen. The resulting −325 mesh product was collected, washed with 500 ml. of ethanol and dried. The dried product was put through a stokes granulator fitted with a 30 mesh screen. The product weighed 1299 g. and contained 20.4% bismuth oxychloride (97% of theory).

EXAMPLE 9

Preparation of a pigment containing 50% BiOCl

In a one liter flask, 26.8 g. of −325 mesh mica was slurried with 73 ml. of mother liquor from a previous run and heated to reflux with stirring.

To this mixture was added a solution of 50 g. (0.1 mol) of $Bi(NO_3)_3·5H_2O$, 55 ml. of 5 N hydrochloric acid and 45 ml. of 5 N nitric acid in 20 ml. increments at 10 minutes intervals. Simultaneously a solution containing 17.6 g. (0.44 mol) NaOH in 375 ml. of water was added continuously at a rate of 6 ml./min. The addition time was 1 hour.

The reaction mixture was cooled, and the solid was filtered off, rinsed and dried. The dried cake was vibrated through U.S. standard 60 and 100 mesh sieves. The yield of product was 92% of theory and it assayed 47% BiOCl.

EXAMPLE 10

Preparation of a pigment containing 75% BiOCl

In a one liter flask 8.9 g. of −325 mesh mica was added to 24 ml. of mother liquor from a previous run and the mixture was heated to reflux with stirring.

BiOCl was precipitated on the mica by simultaneous addition of the two solutions described in Example 9, and the resulting pigment was similarly recovered and dried. The yield was 93% and the product assayed 73% BiOCl.

The source of bismuth may be any water-soluble salt of bismuth. To prevent premature hydrolysis and precipitation of insoluble bismuth compounds, the solution of the bismuth compound may also contain a compatible mineral or other strong acid. Alternatively, an excess of chloride ions (fourfold or greater) will also suppress hydrolysis.

The source of chloride ions may conveniently be hydrochloric acid contained in the solution of the bismuth salt, a soluble chloride may be combined in solution with the strong base, or all of the chloride may be present initially in the mica suspension.

The base used as the precipitating agent is conveniently an alkali metal hydroxide. However, other soluble sources of hydroxyl ions, such as a strongly basic amine, or a base precursor such as urea, are also useful.

The rates at which the soluble bismuth salt, chloride ions, and base are added to the reaction mixture may be varied over wide limits; but to avoid precipitation of bismuth salts other than bismuth oxychloride it is desirable to begin the addition of the bismuth salt before any base is added and thereafter to add the bismuth and the base at such rates that the reaction medium always contains an excess of soluble bismuth and chloride ions. Since bismuth oxychloride is quite insoluble even in strongly acid solutions, the pH of the reaction medium can be quite low, for example a pH in the neighborhood of 1 is satisfactory. Any good grade of mica can be used. If the mica contains large flakes or aggregates, these should be removed and/or broken up before the platelets are coated with bismuth oxychloride. For cosmetic purposes, (the mica should also be clean and free from any impurities or contaminants that might be toxic or irritating to the skin.

The dimensions of the pigments of the present invention may usefully be within the range 10 to 100 microns. For maximum pearlescence the optimum range is 10–40 microns, but including platelets with dimensions up to about 100 microns produces a pleasing sparkling effect which is also useful. The preferred 10–40 micron platelets can be obtained by sifting the mica through a fine mesh, vibrating screen. A −325 mesh screen is ordinarily preferred. This treatment serves to break up any frangible agglomerates and remove any foreign material or large hard particles.

When pigments prepared in accordance with this invention are incorporated in cosmetic compositions, such as lipstick or eye shadow, they impart a pleasing satiny effect which is markedly more translucent than the effects obtainable with pure bismuth oxychloride or other conventional pearlescent pigments. Such cosmetic compositions provide a more natural tinting or coloring of the skin than do the relatively opaque products known heretofore.

The pigments of the present invention are dispersed in cosmetic formulations using procedures familiar to those skilled in the cosmetic arts. Since the desired effects are inherently subjective and esthetic, it will also be evident that the optimum proportions of the pigment to be incorporated in any given cosmetic composition will largely depend upon individual judgments and preferences.

It is preferred that the deposit of bismuth oxychloride be epitaxial, as this is believed to be responsible for the usual translucent effect imparted by the pearlescent pigment. It is to be noted, however, that even without this effect the pigments of the present invention are still novel and possess practical advantages over the bismuth oxychloride pigments known heretofore. Therefore, while epitaxial deposits are preferred, the invention is not limited thereto.

In view of the above, it will be seen that the several objects of the invention are achieved and other advantageous results attained.

As various changes could be made in the above methods and products without departing from the scope of the invention, it is intended that all matter contained in the above description shall be interpreted as illustrative and not in a limiting sense.

What is claimed is:

1. A pearlescent pigment consisting of fine platelets of mica on the surface of which is an epitaxial deposit of bismuth oxychloride, said bismuth oxychloride comprising approximately 10–75% by weight of the pigment.

2. A pigment according to claim 1 in which a preponderance of the mica platelets have dimensions of approximately 10 to 100 microns.

3. A pigment according to claim 1 in which bismuth oxychloride comprises approximately 40% by weight of the pigment.

4. The process which comprises adding a base to an aqueous suspension of mica containing an excess of soluble bismuth salt and chloride ions to precipitate bismuth oxychloride on the surface of the mica platelets and form a pearlescent pigment containing 10–75% by weight of bismuth oxychloride.

5. The process according to claim 4 in which a solution of a soluble bismuth salt and a solution of a base are simultaneously added to an aqueous suspension of mica containing an excess of soluble bismuth salt and chloride ions.

6. A process according to claim 4 in which the base is an alkali metal hydroxide.

7. A process according to claim 4 in which the base is urea.

8. A pigment according to claim 1 in which the mica substantially completely passes a 325 mesh U.S. standard sieve screen.

9. A process according to claim 4 in which the precipitate is an epitaxial deposit of bismuth oxychloride formed on the surface of the mica platelets.

References Cited

UNITED STATES PATENTS

| 2,974,053 | 3/1951 | Suchow | 106—291 |
| 3,087,827 | 4/1963 | Klenke et al. | 106—291 |
| 3,342,617 | 9/1967 | Jackson | 106—291 |

JAMES E. POER, Primary Examiner

U.S. Cl. X.R.

106—308B

UNITED STATES PATENT OFFICE
CERTIFICATE OF CORRECTION

Patent No. 3,597,250                    Dated August 3, 1971

Inventor(s) Robert D. Rands, Jr. and Douglas W. Chapman

It is certified that error appears in the above-identified patent and that said Letters Patent are hereby corrected as shown below:

Column 1, line 40, "lipstick" should read -- lipsticks --. Column 2, line 58, "Grams" should read -- gram --. Column 3, line 6, "Aftter" should read -- After --. Column 4, line 14, "$Bi(NO_2)_3.5H_2O$" should read -- $Bi(NO_3)_3 \cdot 5H_2O$ --; line 29, "Ppreparation" should read -- "Preparation". Column 5, line 51, "(the" should read -- the --. Column 6, line 12, "usual" should read -- unusual --; line 62, "3/1951" should read -- 3/1961 --.

Signed and sealed this 29th day of February 1972.

(SEAL)
Attest:

EDWARD M. FLETCHER, JR.              ROBERT GOTTSCHALK
Attesting Officer                    Commissioner of Patents